July 6, 1943.  R. K. O. SAHLBERG  2,323,844
BOLTLESS WOOD CONNECTION
Filed March 3, 1942

INVENTOR.
Rolf K.O. Sahlberg
BY
ATTORNEY

Patented July 6, 1943

2,323,844

UNITED STATES PATENT OFFICE 2,323,844

BOLTLESS WOOD CONNECTION

Rolf K. O. Sahlberg, New York, N. Y.

Application March 3, 1942, Serial No. 433,140

7 Claims. (Cl. 20—92)

This invention relates to the connection of two or more wooden members, these members subject to direct force (tension or compression) to bending moment or to the combination of direct force and bending moment. More especially, the invention relates to the connection of the different members in truss constructions, to the shaping of the stiff corners in frame constructions and to the connection of girders to columns.

At present, a type of wood connection resembling my invention with multiple gusset plates of steel is known to the art but is not used to any appreciable extent due to shortcomings in the design. It consists of solid wooden members representing chord with attached lattice system, in which a number of parallel steel gusset plates are inserted in corresponding slots. The load transmitting members are bolts going through holes in the wooden member and the gusset plates, these holes being opposite each other. The disadvantage in this design is that a bolt cannot be fitted so tight in a hole through separate members, that a direct stress transmission can take place uniformly along the bolt. Furthermore, in a connection having series of bolts, the stress transmission does not take place uniformly among all the bolts. What takes place is, that certain parts making up one hole, and certain bolts in a group of several, are so over-stressed at certain points, that the elastic limit of the material is reached, giving cause to undue deformation in the connection which is intended to be fixed. These shortcomings occur in any one and all of the connections in a truss construction and give rise to unpredictable deformation of the structure and, also to a great extent invalidate the value of the safety factor.

The main object of my invention is to overcome these disadvantages. By using a connection in accordance with my design, the different members being fixed in respect to each other and, furthermore, every member, and also every part of any member, receives its intended part of the stress distribution. Due to these features, it is possible to design truss constructions and frame constructions using wood members with the same accuracy, as if they were designed of steel with riveted connections. In most constructions for roofs, hangars, manufacturing plants, high-tension power lines wood can be substituted for the customary steel used and, by that, save steel for other purposes.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In order that the invention may be better understood, attention is directed to the accompanying drawing forming a part of this specification, in which Figure 1 is a side elevation of one form of my improved wood connection illustrating a chord of a truss with two diagonals, gusset plates and dowel;

Figure 1:
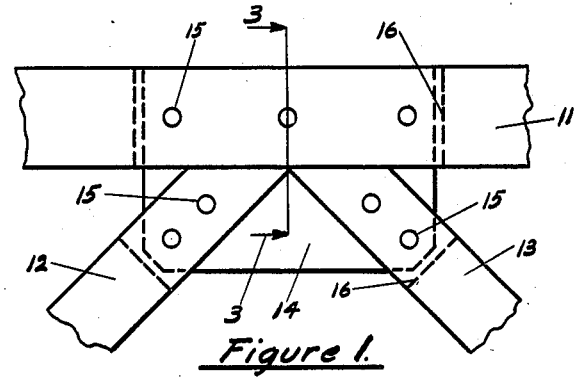
Figure 2:
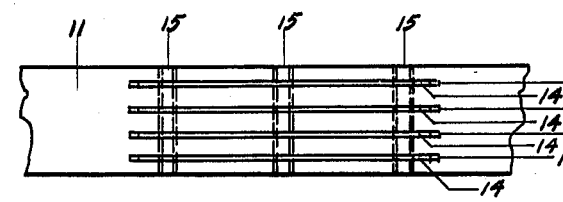
Figure 2 is a top plan view thereof.
Figure 3:
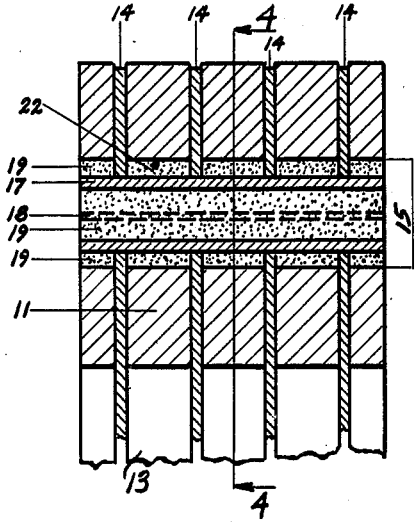
Figure 3 is a sectional view taken on the line 3—3 Fig. 1, at a somewhat larger scale for the sake of clarity.
Figure 4:
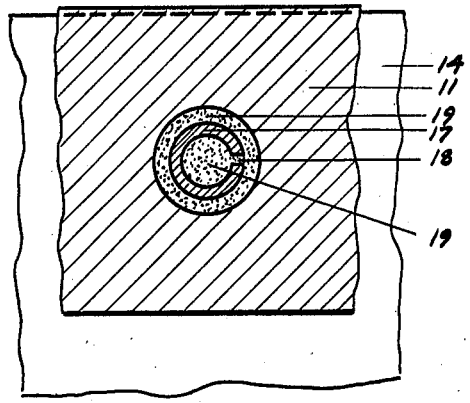
Figure 4 is a sectional view taken on line 4—4 Fig. 3.

The connection illustrated in Figs. 1 to 4 is typical for a truss construction comprising a chord member 11 two diagonal members 12 and 13 a plurality of thin gusset plates 14 and steel dowel 15. The members constituting chord and diagonals have a number of vertical slots 16 and in each of these slots there is located one of the gusset plates 14. The slots 16 have the same spacing in chord member as in diagonal members so that, when a gusset plate is inserted through a slot in the chord, it also penetrates the corresponding slot in the diagonals. The chord, diagonals and gusset plates have holes through which the connecting rods 15 can be inserted from one side and pressed through the hole until its two ends are flush with the vertical outside surfaces of the chord and diagonals.

The holes in the gusset plates have a slightly smaller diameter than the holes in the chord member and diagonal members. Furthermore, the center of the holes for these members are in the same axial alinement or as close as can be done; so looking through one hole there are two concentric circles, the outside one representing the hole in the chord or diagonal, and the inside one representing the hole in the gusset plates.

The dowel 15 consists of a pipe 17 in which a slot 18 has been cut, this slot extending all along the pipe. The diameter of the pipe 17 is slightly larger than the holes in the gusset plates 14 and somewhat smaller than the holes in the chord 11, or the holes in the diagonals 12 and 13. The pipe 17 is forced sideways through the holes in the gusset plates. This can be accomplished, because the longitudinal slot 18 in the pipe 17 permits said pipe to contract and to frictionally engage the sides of the holes in the gusset plates 14. Due to the foregoing construction, a perfect contact for stress transmission exists between the gusset plates and the pipe when the said pipe is in place.

As mentioned before, there is a space between the inside surface of the holes in the chord 11 and diagonal members, and the outside surface of the pipe 17. In order to lock the connection, this space is completely filled with a cementitious material 19 which is or may be poured into the pipe 17 under pressure after one end has been temporarily closed. The cementitious material fills the pipe and flows through the slot 18 and completely fills the empty space mentioned above. When the cementitious material has set, there exists a perfect condition for stress transmission between the chord and diagonal members on one side and the pipe on the other. That part of the cementitious material located inside the pipe and in the slot deprives the pipe of its resilience, and the pipe and the hardened cementitious material have become a non-flexible connecting rod transmitting forces between wooden members and gusset plates with the same accuracy as a rivet in a steel connection.

The cementitious material used is of the type having no shrinkage when it hardens. On the contrary, it is advantageous if a slight swelling takes place. Furthermore, the compressive strength in hardened condition will be of the same magnitude as that of the wood parallel to the fibres. A material having these qualifications is plaster of Paris, either neat or mixed with some other material. I prefer to make use of plaster of Paris to which neat cement has been added as being the most economical, but do not limit myself to these materials. A great many other cementitious materials can be used with advantage, and also others not strictly cementitious materials, such as plastics, masonite and others.

After the holes have been drilled in the wooden members, the surface cut by the drill in the wood is covered by a thin layer of some moisture resistant material 22, such as varnish or some insoluble glue. The purpose of this operation is to protect the wooden fibres from the free moisture in the cementitious material during the period of setting.

Figure 5:
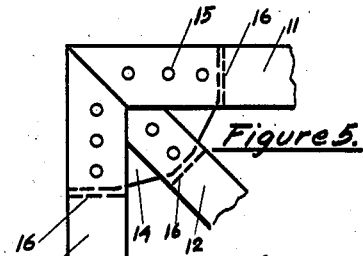
Figure 5 is a side elevational view of another form of connection customary in truss construction.
Figure 6:
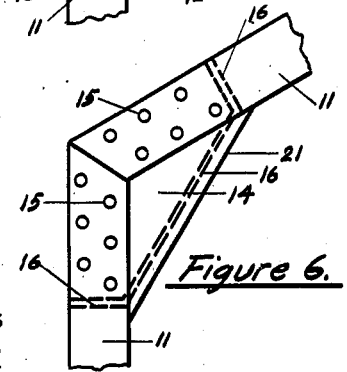
Figures 6 and 7 are side elevational views of still other forms of connections customary in frame constructions.
Figure 7:
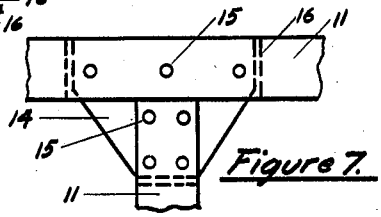

It is evident from Figs. 1, 5, 6 and 7 which illustrate in side elevation the different forms of connections, that part of the gusset plates protrude outside the wooden members. To cover these parts of the gusset plates, a wooden member 21 (shown in Figure 6) having slots corresponding to the spacing of the gusset plates is fitted into the corners between the different wooden members. The bottom of the slots correspond to the outside edge of the gusset plates and beyond the bottom of the slots is solid wood with a thickness more or less arbitrary. The purpose of these wooden blocks is to protect the gusset plates, to provide lateral support for the edges of the gusset plates, which is important for connection taking moments (Figures 6 and 7), and also to give a streamlined appearance to the connection.

For the sake of clarity I have used the same numerals to indicate the various parts in the modified forms of the invention as I have in Figs. 1 to 4.

I desire it understood that wherever desirable the wooden portions of the connections hereabove described may be chemically treated to resist fire and disintegration.

Having now described my invention, what I claim as new, and desire to secure by Letters Patent is:

1. In a wood connection, a slotted wooden member, at least one metallic plate inserted in a slot of said wooden member and extending outwardly thereof, said wooden member and said plate having at least one set of co-axial holes of which the hole in said plate is smaller than the holes in said wooden member, a tubular dowel of resilient material having a longitudinal slot throughout its length and passing through said co-axial holes, the original diameter of said dowel being slightly larger than the diameter of the hole in said plate, and a filling of hardened material located in the slot of said dowel and in the spaces within said dowel and between said wooden member and said dowel.

2. In a wood connection, a wooden member having a plurality of parallel slots, a plurality of gusset plates inserted parallel to each other in slots of said wooden member whereby parallel layers of said wooden member alternate with parallel gusset plates, said layers and said plates having at least one set of co-axial holes of which the holes in said gusset plates are smaller than the holes in said layers, at least one tubular dowel of resilient material having a longitudinal slot throughout its length and passing through a set of said co-axial holes, the original diameter of said dowel being slightly larger than the diameter of the holes in said gusset plates, and a filling of hardened material located in the slot of said dowel and in the spaces within said dowel and between said wooden member and said dowel.

3. In a wood connection, a slotted wooden member, at least one gusset plate inserted in a slot of said wooden member, said wooden member and said gusset plate having at least one set of co-axial holes of which the hole in said gusset plate is smaller than the holes in said wooden member, at least one tubular dowel of resilient material having a longitudinal slot throughout its length and passing through a set of said co-axial holes, and a filling of a hardened cementitious mixture located in the spaces between said wooden member and said dowel and within said dowel whereby said originally radially resilient dowel is made rigid.

4. In a wood connection, a slotted wooden member, at least one gusset plate inserted in a slot of said wooden member, said wooden member and said gusset plate having at least one set of co-axial holes of which the hole in said gusset member is smaller than the holes in said wooden member, at least one tubular dowel of resilient material having a longitudinal slot throughout its length and passing through a set of said co-axial holes, and a filling of a hardened mixture of plaster of Paris located in the spaces between said wooden member and said dowel and within said dowel whereby said originally radially resilient dowel is made rigid.

5. In a wood connection, a slotted wooden member, at least one gusset plate inserted in a slot of said wooden member, said wooden member and said gusset plate having at least one set of co-axial holes of which the hole in said gusset plate is smaller than the holes in said wooden member, at least one tubular dowel of resilient material having a longitudinal slot throughout its length and passing through a set of said co-axial holes, a layer of moisture resistant material covering the walls of said holes in said wooden member, and a filling of hardened cementitious material located in the spaces between said layer and said dowel and within said dowel.

6. A method for a wood connection of that kind where at least one metallic plate is inserted between wooden layers, said method comprising drilling at least one set of co-axial holes into said plate and said wooden layers, the hole in said plate being made smaller than the holes in said wooden layers, then forcing a slotted resilient tubular dowel through said set of holes whereby said dowel frictionally engages the inner surface of the hole in said plate and keeps a distance from the inner surfaces of the holes in said wooden layers, and then filling the spaces between said wooden layers and said dowel and within said dowel with a hardening material.

7. A method for a wood connection of that kind where at least one metallic plate is inserted between wooden layers, said method comprising drilling at least one set of co-axial holes into said plate and said wooden layers, the hole in said plate being made smaller than the holes in said wooden layers, then forcing a slotted resilient tubular dowel through said set of holes whereby said dowel frictionally engages the inner surface of the hole in said plate and keeps a distance from the inner surfaces of the holes in said wooden layers, and then pressing a hardening plastic through said slotted tubular dowel into the spaces between said wooden layers and said dowel and into the slots and the inner space of said dowel.

ROLF K. O. SAHLBERG.